(12) United States Patent
Putch

(10) Patent No.: US 7,703,773 B2
(45) Date of Patent: Apr. 27, 2010

(54) SEAL RING AND METHOD

(76) Inventor: Samuel W. Putch, 5727 Portal Dr., Houston, TX (US) 77096

( * ) Notice: Subject to any disclaimer, the term of this patent is extended or adjusted under 35 U.S.C. 154(b) by 326 days.

(21) Appl. No.: 11/789,184

(22) Filed: Apr. 24, 2007

(65) Prior Publication Data
US 2008/0029971 A1 Feb. 7, 2008

Related U.S. Application Data

(62) Division of application No. 11/191,888, filed on Jul. 28, 2005, now abandoned.

(51) Int. Cl.
*F16L 17/06* (2006.01)
*H02G 3/22* (2006.01)
(52) U.S. Cl. .................. 277/314; 277/606; 277/616
(58) Field of Classification Search ........... 277/314, 277/606, 608–609, 616, 630, 637, 644
See application file for complete search history.

(56) References Cited

U.S. PATENT DOCUMENTS

| | | | |
|---|---|---|---|
| 4,410,186 A | 10/1983 | Pierce, Jr. | |
| 4,452,462 A * | 6/1984 | Karr, Jr. | 285/112 |
| 5,058,906 A | 10/1991 | Adameck et al. | |
| 5,240,263 A | 8/1993 | Nicholson | |
| 5,257,792 A | 11/1993 | Putch et al. | |
| 6,722,426 B2 * | 4/2004 | Sweeney et al. | 166/115 |

* cited by examiner

*Primary Examiner*—Vishal Patel
(74) *Attorney, Agent, or Firm*—Browning Bushman P.C.

(57) ABSTRACT

A seal ring 10 for sealing between first and second members 12, 14 each having an outer groove surface 16, 126 and inner groove surface 18, 127 includes a metal seal body 26, 42, 52, 60, 70, 80, 92, 110, 122, 140 for engagement with the outer groove surface on the first and second members, and a metal flexible flange 30, 32, 44, 46, 54, 56, 62, 64, 76, 78, 88, 90, 94, 96, 112, 114, 128, 144, 146 with a cantilevered end of a flexible flange providing substantially line contact sealing engagement with the inner groove surface on respective first and second member. The metal flexible flange is configured for being fluid pressure energized, and is deformed beyond its elastic limit when securing members secure the first member to the second member.

13 Claims, 7 Drawing Sheets

SEAL RING AND METHOD

CROSS REFERENCE TO RELATED APPLICATIONS

This application is a divisional of U.S. patent application Ser. No. 11/191,888 filed on Jul. 28, 2005 now abandoned, for Seal Ring and Method, the disclosure of which is incorporated herein by reference.

FIELD OF THE INVENTION

This invention relates to seal rings of a type for sealing between first and second members each having a through-bore, such as flanges, clamps, and hub type connectors. More particularly, this invention relates to a seal ring which is pressure energized within the groove receiving the sealing ring, thereby maintaining sealing integrity even if the securing bolts between the first and second members elongate to permit flange separation.

BACKGROUND OF THE INVENTION

Pressure vessels are conventionally composed of structural sections having flanges or other connectors at their extreme ends. The flanges are secured to the assembly by securing bolts that extend through the mating flanges. The opposed flanges may be drawn together about a metal sealing ring with sufficient force to cause metal-to-metal sealing between surfaces on the seal ring and tapered surfaces on the opposing seal grooves in the first and second members.

An API seal ring may leak under circumstances where the bolts are properly tightened to secure the flanges in sealed engagement, but thereafter excessive heat causes bolt extension such that the flanges are allowed to be moved apart a slight amount. When this occurs, there may be insufficient mechanical force between the seal ring and the mating wall surfaces of the seal groove to maintain a fluid tight seal. Also, when the flange bolts are made up very tightly, metal coining between the seal ring and the mating wall surfaces may occur, in which case only a slight movement of the flanges may cause seal leakage. Coining of the seal ring typically occurs, because the seal ring metal is less hard than the metal defining the receiving grooves in the flange. Overstressing the studs to shut off a leak may also cause coining of the seal ring groove. It is frequently recommended to employ periodic tightening of flange bolts to prevent leaking in high temperature applications.

U.S. Pat. No. 4,410,186 discloses a seal ring for flanged joints, and was part of a seal concept for nuclear reactor applications. Due to wide tolerances, an API seal ring groove would be coined by this type of seal ring. To eliminate coining, one would have to make several sizes of a seal ring for a specific ring groove. This type of seal ring also would not seem suitable for holding pressures at high temperatures when the studs elongate because of its limited flexibility.

U.S. Pat. No. 5,058,906 discloses a seal ring formed from a high strength material. For the seal ring to function, the ring flexes against the ring groove wall to burnish and form a seal. The seal ring is intended to flex within its elastic limits, and again would require numerous different seal rings to work satisfactorily within a single API ring groove.

U.S. Pat. No. 5,240,263 discloses a seal ring with a substantial uniform cross sectional thickness. The patent teaches substantially planar contact between surfaces of the seal ring and the tapered surfaces defining the seal groove. This type of seal may leak because there is no pressure energization. Because the seal areas are large, pressure can migrate into the seal area thus equalizing pressure, resulting in leakage.

The disadvantages of the prior art are overcome by the present invention, and an improved seal ring and method are hereinafter disclosed for reliable sealing between two members.

SUMMARY OF THE INVENTION

In one embodiment, a seal ring for sealing between first and second members each having an outer groove surface and an inner groove surface includes a metal seal body for engagement with each of the radially outward surfaces on the first and second members when the securing members secure the first member to the second member. A metal flexible flange radially inward of the seal body has a cantilevered end which provides substantially line contact sealing engagement with a respective inner groove surface, while a spacing or gap between the flexible flange and the seal body provides for fluid pressure energization of the flexible flange. The flexible flange is deformed beyond its elastic range when the securing members secure the first member to the second member.

In another embodiment, the seal ring includes a metal flexible flange supported on the seal body and extending radially inward such that a cantilevered end of a flexible flange provides substantially line contact engagement with one of a groove base surface and an inner groove surface on the respective first or second member. The flexible flange is deformed beyond its elastic limit when the securing members secure the first member to the second member, and a spacing or gap between the flexible flange and the seal body provides for fluid pressure energization of the flexible flange.

The seal ring as disclosed herein is able to maintain dynamic sealing integrity even in the event of a fire. Due to plastic yielding and/or telescoping, the shape of the seal is able to change while maintaining high sealing reliability.

These and further features and advantages of the present invention will become apparent from the following detailed description, wherein reference is made to the figures in the accompanying drawings.

BRIEF DESCRIPTION OF THE DRAWINGS

FIG. 10B illustrates the same sealing ring with the securing members tightened.

DESCRIPTION OF THE PREFERRED EMBODIMENTS

Figure 1:
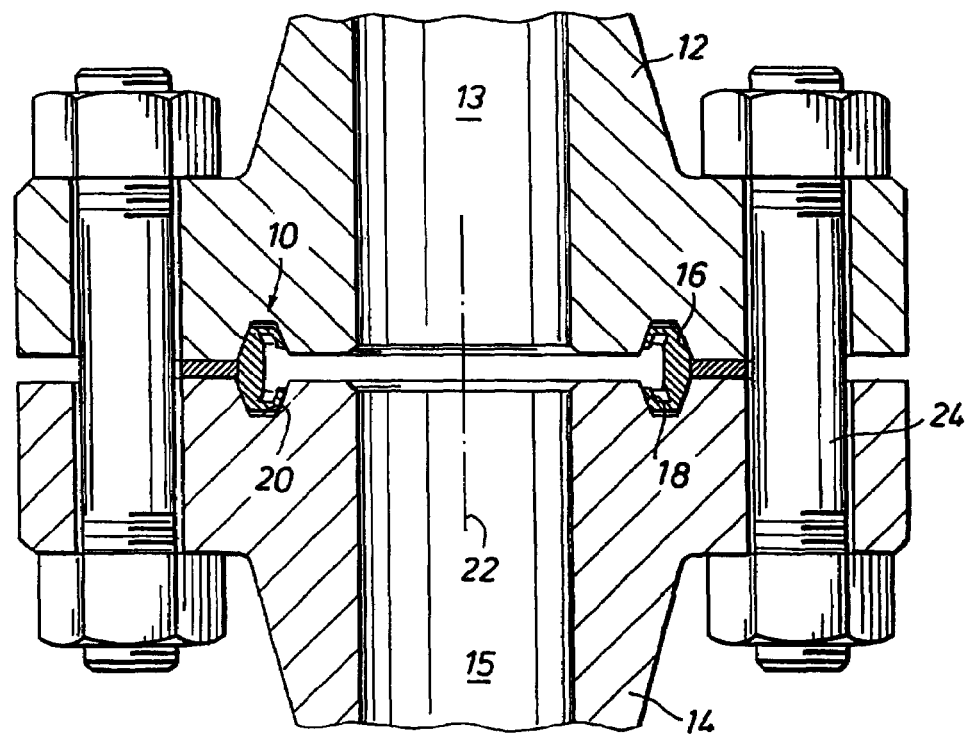
FIG. 1 illustrates a side view of a seal ring according to the present invention for sealing between first and second members.

FIG. 1 illustrates a seal ring 10 for sealing between first and second members 12, 14 each having a respective throughbore 13, 15. Each member 12, 14 has an outer tapered groove surface 16 directed radially inward in a direction away from an interface between the members 12, 14, and an inner tapered groove surface 18 directed radially outward in a direction away from the interface between members 12 and 14. A groove base 20 is shown spaced between the surfaces 16, 18, and is substantially perpendicular to a common axis 22 of the throughbores. A plurality of securing members 24, such as bolt and nut assemblies, are arranged circumferentially about the members 12, 14 and secure the first member to the second member. In some applications, clamping devices or other types of flange connecting members may be used to rigidly secure the first member to a flange end of a second member. An annular groove formed by the surfaces 16, 18, 20 is thus provided for receiving the sealing ring 10 therein.

Figure 2:
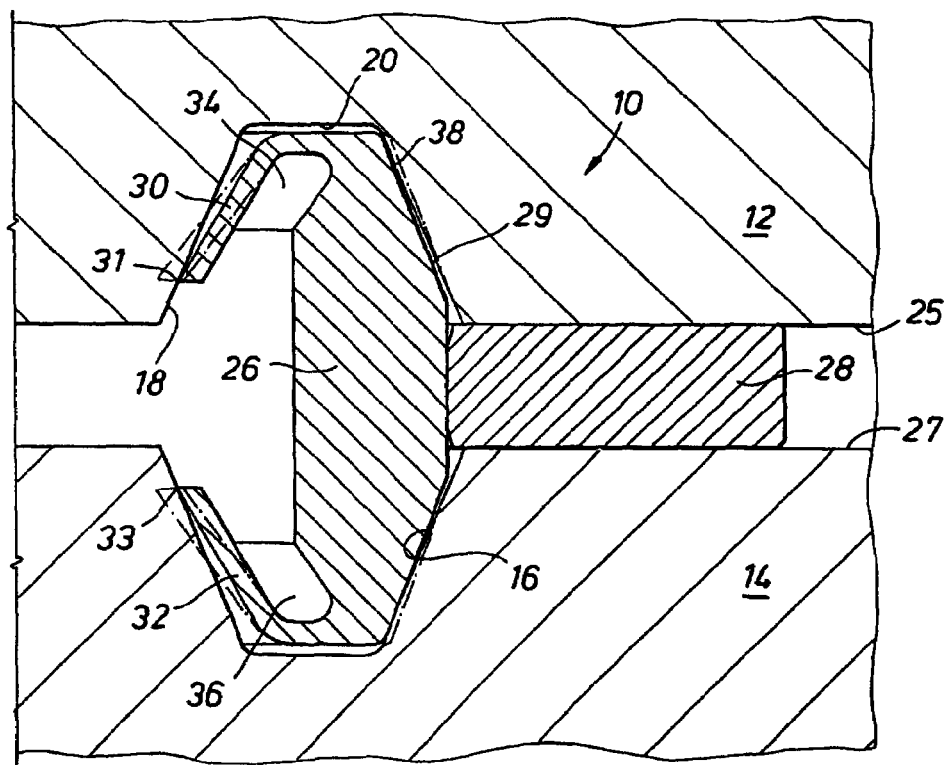
FIG. 2 illustrates in greater detail a cross section of the seal ring shown in FIG. 1.

Referring to FIG. 2, the sealing ring 10 comprises a metal seal body 26 for engagement with the radially outer surface 16 on the first and second members when the securing members 24 secure the first member to the second member. An annular flange 28 may be pressed on or otherwise secured to the seal body 26, and is compressed between the surface 25 on the body 12 and surface 27 on the body 14 when the bolts 24 are tightened. The sealing ring 10 further includes a pair of metal flexible flanges 30, 32 each radially inward of the seal body 26, such that a cantilevered end 31, 33 of each flexible flange provides substantially line contact sealing engagement with the inner tapered surface 18 on a respective first and second member 12, 14. A spacing 34, 36 between each flexible flange and the seal body 26 provides for fluid pressure energization of the flexible flange. As shown in FIG. 2, the spacing 34, 36 includes a minimum spacing between a radially outward planar surface of the flexible flange and a radially inward planar surface of the metal seal body. This minimum spacing is substantially greater than a minimum thickness of the corresponding metal flexible flange. At least a portion of this minimum spacing is formed by an outer planar surface of the flexible flange and a corresponding inner planar surface of the metal seal body being substantially parallel surfaces. The cantilevered or tip end 31, 33 of each flange is thus forced radially inward into tighter sealing engagement with a respective surface 18 in response to high pressure fluid in the bore of the members 12, 14.

For the embodiment as shown in FIG. 2, the seal body 26 and the flexible flanges 30, 32 are formed from a unitary homogeneous material. In other applications discussed below, the annular flange 28 and the seal body 26 may be formed from a unitary homogeneous material. The seal body 26 and the pair of flanges 30, 32 as shown in FIG. 2 form a substantially C-shaped cross-sectional configuration, as shown in FIGS. 1 and 2.

FIG. 2 depicts in dashed lines the "as manufactured" configuration of the seal body and flexible flanges, and illustrates in solid lines the final position of the seal body and flexible flanges after the bolts have been tightened and before high pressure is applied to the seal ring 10. There is a small angular mismatch between the radially outer tapered surface 29 on the seal body 26 and the corresponding outer tapered surface 16 on each of the members 12 and 14, with this mismatch resulting in a substantially line contact seal 38 between the seal body and the surfaces 16. Those skilled in the art appreciate that, in response to high fluid pressure within the bore, the mismatched surfaces on the seal body may be pressed outward into substantially planar engagement with the groove surfaces 26 on the first and second members, since the seal body deforms slightly in response to this high fluid pressure. Whether under high pressure or low pressure, the seal between these components is effectively provided by line contact engagement, since even under high pressure, substantially higher sealing forces are exerted at point 38 than at other points along the radially outer surface 27 of the seal body. Thus even if high pressure results in substantially planar contact between surfaces 27 and 16, substantially line contact metal-to-metal sealing is achieved at point 38.

Sealing effectiveness of the seal ring is not solely dependent upon bolt loading, since the flexible flange of the seal ring is also pressure energized. Also, the surface on the first and second member which is sealingly engaged by a metal flexible flange preferably is not coined. The seal ring changes its shape to maintain seal integrity when opposing seal grooves move apart due to temperature changes or changes in the seal ring due to flexure or yielding, or by telescoping of the seal ring, as explained further below. During substantial separation of the first and second members, the flanges may move axially apart 0.025 inches or greater, yet seal integrity may be maintained at a high pressure. The seal maintains an effectiveness during flange separation, and is interchangeable with standard API and/or ANSI seal rings.

By including a flexible flange on the seal ring ID and an interference fit on the seal ring OD, the installed flexible flange tip makes sealing contact with a wall of the groove, while a corner of the OD of the seal ring and/or an annular sealing bump on the OD of the seal ring contacts the outside groove wall. When the flange bolts are tightened, the flexible flange is flexed outwardly while the OD of the seal ring is flexed inward, resulting in strengthened self-energization of the seal ring. When internal pressure is applied to the seal ring, an additional fluid pressure generated force is created on the flexible flange, while simultaneously an outward force is created on the seal body. These fluid pressure induced forces further strengthen the seal and establish a pressure-energized seal. The seal ring maintains sealing integrity during flange face separation since the inward flexure of the seal body and the outward flexure of the flexible flange stores energy in the seal ring, acting in the manner of a spring. This stored energy is released when being supplemented by the internal fluid pressure within the first and second members to maintain contact between the seal ring and the groove walls during separation.

Figure 3A:
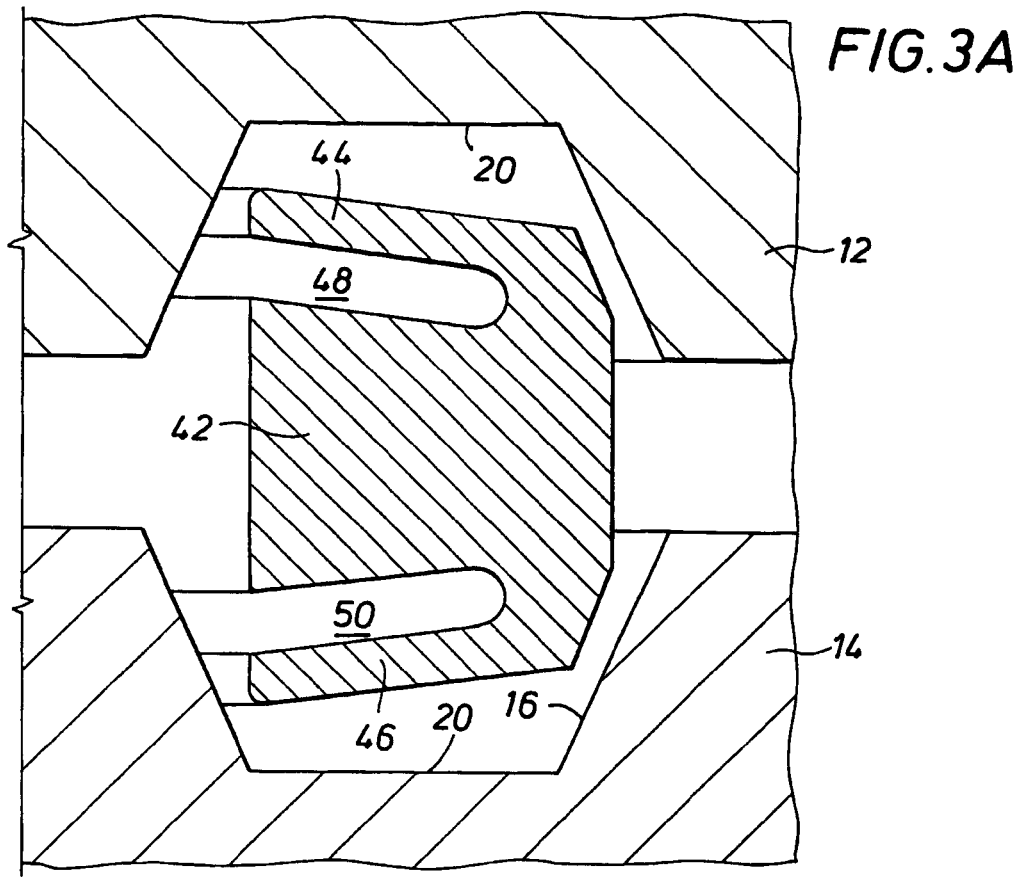
FIG. 3A discloses an alternate embodiment of a seal ring, and FIG. 3B discloses a seal ring as shown in FIG. 3A when the securing members have secured the first member to the second member.

FIG. 3A depicts an alternate seal body 42 and a pair of metal flexible flanges 44 and 46 with a spacing 48, 50 provided between each flexible flange and the seal body 42. The seal body as shown in FIG. 3A does not include a annular flange, and accordingly the surface 25 on the member 12 directly engages the surface 27 on the member 14 when the bolts are tightened, as shown in FIG. 3B.

Figure 3B:
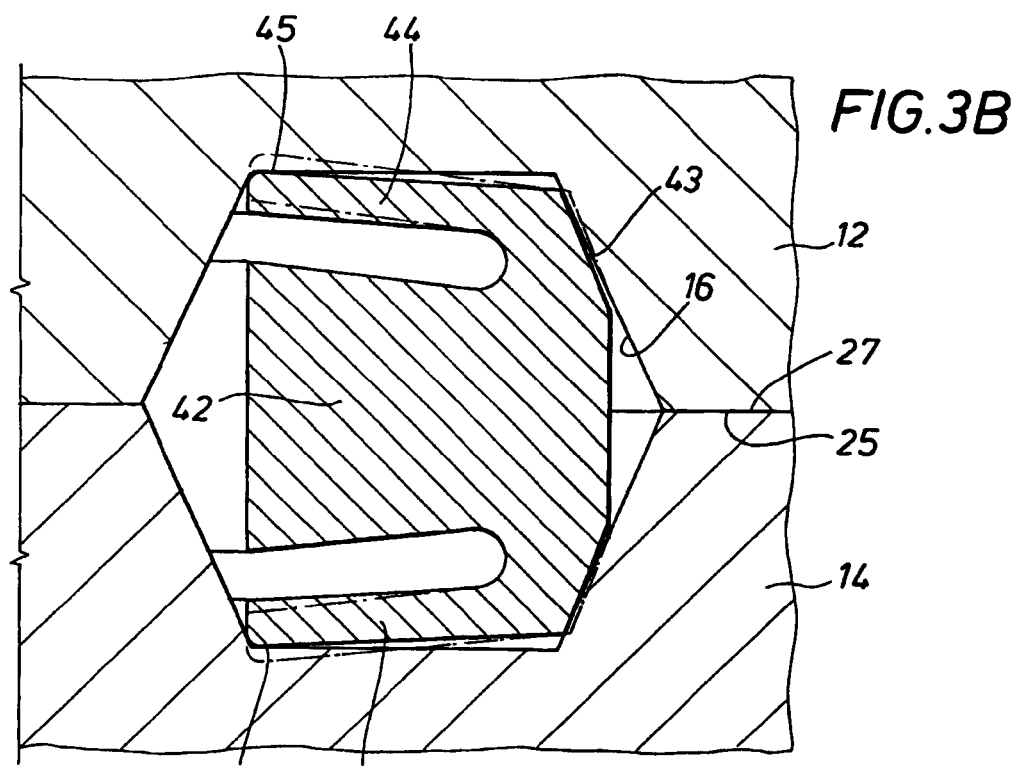

FIG. 3B also depicts each flexible flange 44, 46 in substantially line contact sealing engagement with the base surface 20 at point 45 on the cantilevered end of flanges 44 and 46. Again, the configuration of the seal body and flexible flanges in its "as manufactured" condition is shown in dashed lines in FIG. 3B, and is shown in solid lines in its position when the bolts are tightened. Other seal configurations discussed below also show the "as manufactured" and "final" position, although only the final position is shown in some figures. All seal configurations are, however, deflected before obtaining the final configuration. The end surface 45 forming a substantially line contact seal is thus similar to the end surface 31 shown in FIG. 2, except that sealing engagement in the FIG. 3B embodiment is with the base surface 20 rather than the inner groove surface 18. A mismatch between the angle of the surface 16 and the radially outward angled surfaces 43 on the seal body 42 are depicted, with the body thus being configured for substantially line contact sealing engagement with each of the annular flanges.

Figure 4:
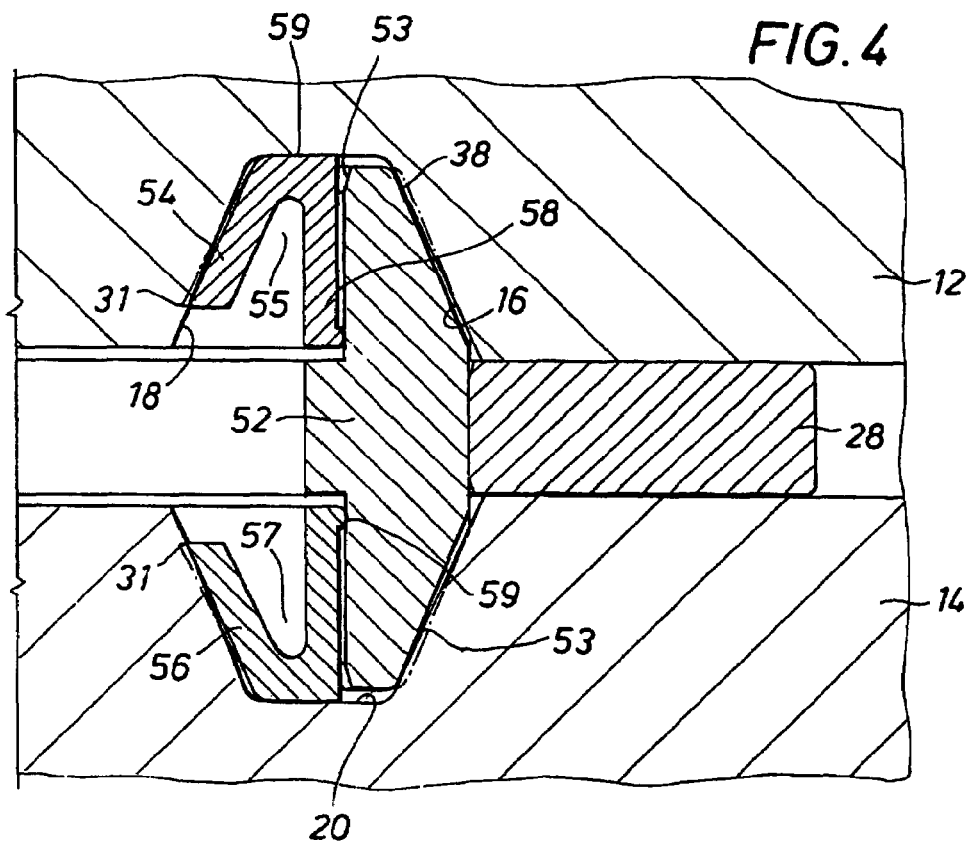
FIG. 4 discloses yet another embodiment of a seal ring wherein the flexible flanges are slidably movable relative to the seal body.

Referring to FIG. 4, the seal body 52 is provided with an annular flange 28. A mismatch between the outer surface 53 on body 52 and the tapered outer groove surface 16 results in line contact sealing engagement with the members 12, 14 at sealing point 38. A pair of metal flexible flanges 54 and 56 provide a line contact seal with the surfaces 18 on the first and second members at point 31, while spacing 55, 57 between the metal flexible flanges 54, 56 and the seal body 52, and in this case between the flexible flanges 54, 56 and the flange supporting component 58 of each flexible flange, provides fluid pressure energization of the flexible flange. The flange component 58 is slidable in a generally axial direction relative to the seal body 52, and the surfaces 59 on the flanges 54, 56 engage the base surface 20 of the groove in response to high fluid pressure, as shown. Again, the flexible flange is deformed beyond its elastic range when the securing member secure the first member to the second member. Sealing between 58 and 52 is accomplished by tapering one of the surfaces on 58 or 52 which engage the other component, and/or by providing an annular bump or protrusion on one of these surfaces.

Figure 5:
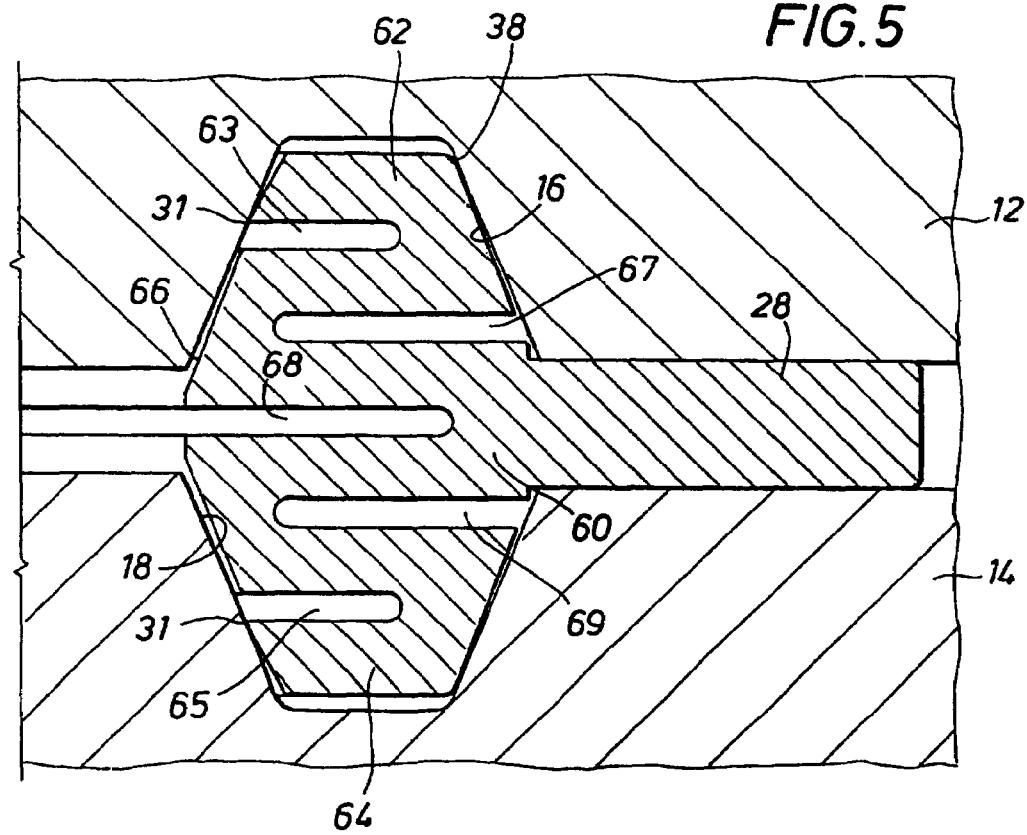
FIG. 5 discloses yet another embodiment of a seal ring.

FIG. 5 depicts yet another embodiment of a seal ring, wherein the seal body 60 is unitary and homogeneous with the annular flange 28. In this case, the seal body supports flexible end flanges 62 and 64 each open to fluid pressure energization by a respective gap 66 provided between the surface 18 and the body 60. Spacings 63, 65 provide for fluid pressure energization of the flexible flanges 62 and 64. Additional slots 67, 68 and 69 are provided for increasing the flexibility of the end flanges 62, 64, with slots 67 and 69 being directed substantially radially inward, and the slot 68 being directed substantially radially outward. The seal ring 60 seals at point 38 with the surface 16 as previously explained, and the cantilevered end 31 of each flange member 62, 64 thereby obtains substantially line contact sealing engagement with the surface 18.

Figure 6:
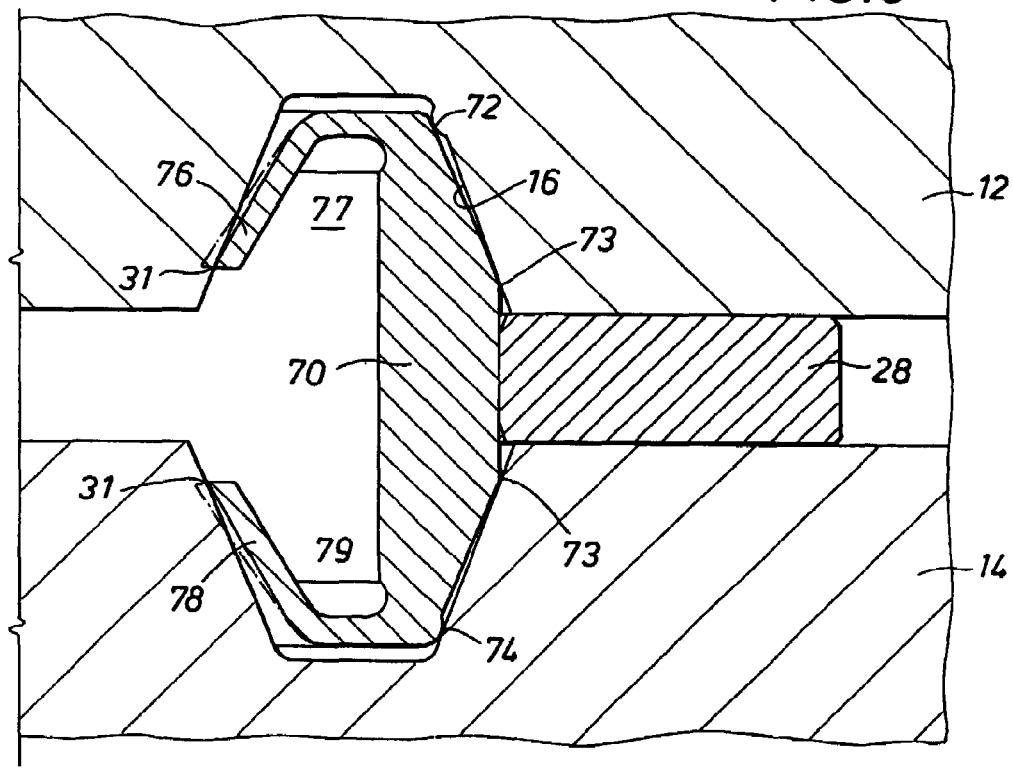
FIGS. 6 and 7 disclose additional embodiments of a seal ring.

FIG. 6 depicts another embodiment on a metal seal body 70 having a radially outward flange 28 secured thereto. The seal body is intended for substantially line contact sealing engagement with the radially outward surface of each member 12, 14, and accordingly annular bump 72 is provided on the member 12 for substantially line contact sealing engagement with the seal body 70, while the mismatch of the angles between the outer surface of the seal body and the radially outward groove wall 16 also may or may not provide line contact sealing at point 73. As an alternative to providing the raised bump 72 on the member, a sealing bump 74 may be provided on the seal body, as shown in FIG. 6. A pair of metal flexible flanges 76 and 78 are each configured for substantially line contact sealing engagement with the radially inward tapered surface of the members 12, 14 at point 31. A spacing 77, 79 is provided between each flexible flange and the seal body for fluid pressure energization of the flexible flanges. Each of the flexible flanges 76, 78 is deformed beyond its elastic limit when the securing members secure the first member to the second member.

Figure 7:
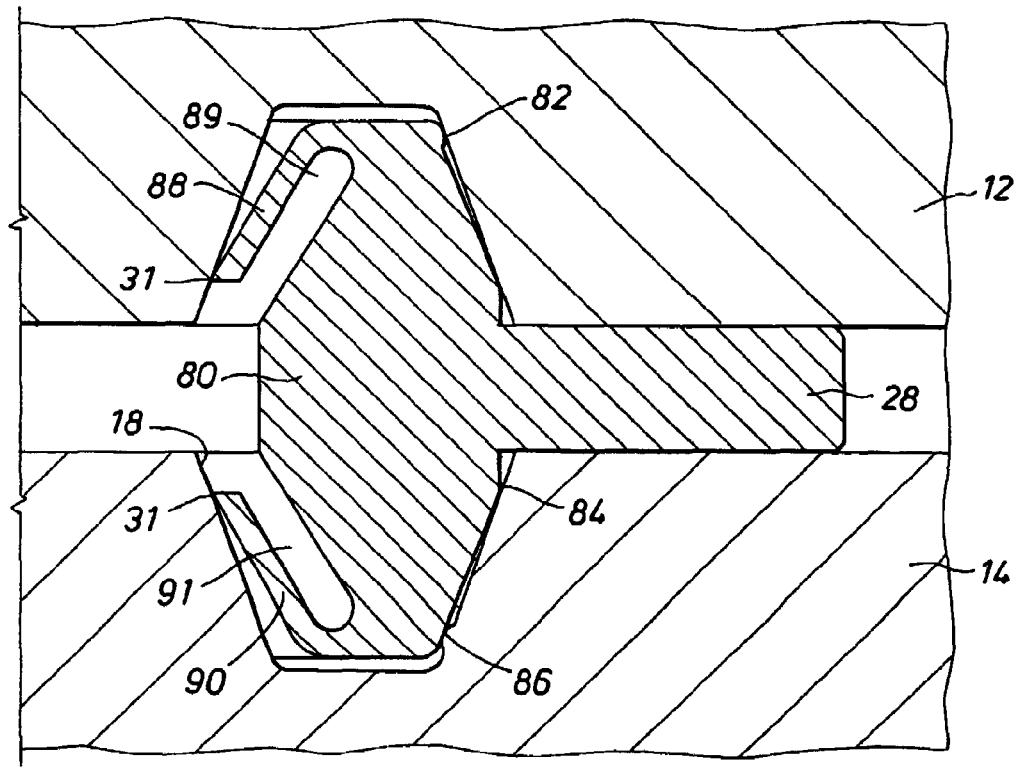

The embodiment in FIG. 7 illustrates an alternative seal body 80 which is integral with the radially outward flange 28. Line contact sealing engagement with the member 12 is provided by the annular bump 82 on the seal body, and by the mismatch surfaces which may result in line contact sealing at point 84. FIG. 7 also depicts a bump 86 provided on the lower member 14 for line contact sealing engagement with the seal body. The pair of flexible flanges 88 and 90 include respective spacings 89 and 91 for fluid pressure energization of the flexible flanges. Each flange 88, 90 is thus pressure energized, and provides a substantially line contact seal with the groove surface 18 at point 31. If desired, one of the bumps on the seal body or on the member 12, 14, or one of the line contact seals 84 created by angular mismatch, may be eliminated, since both a primary and a backup seal with each member 12, 14 is shown in FIGS. 6 and 7.

Figure 8:
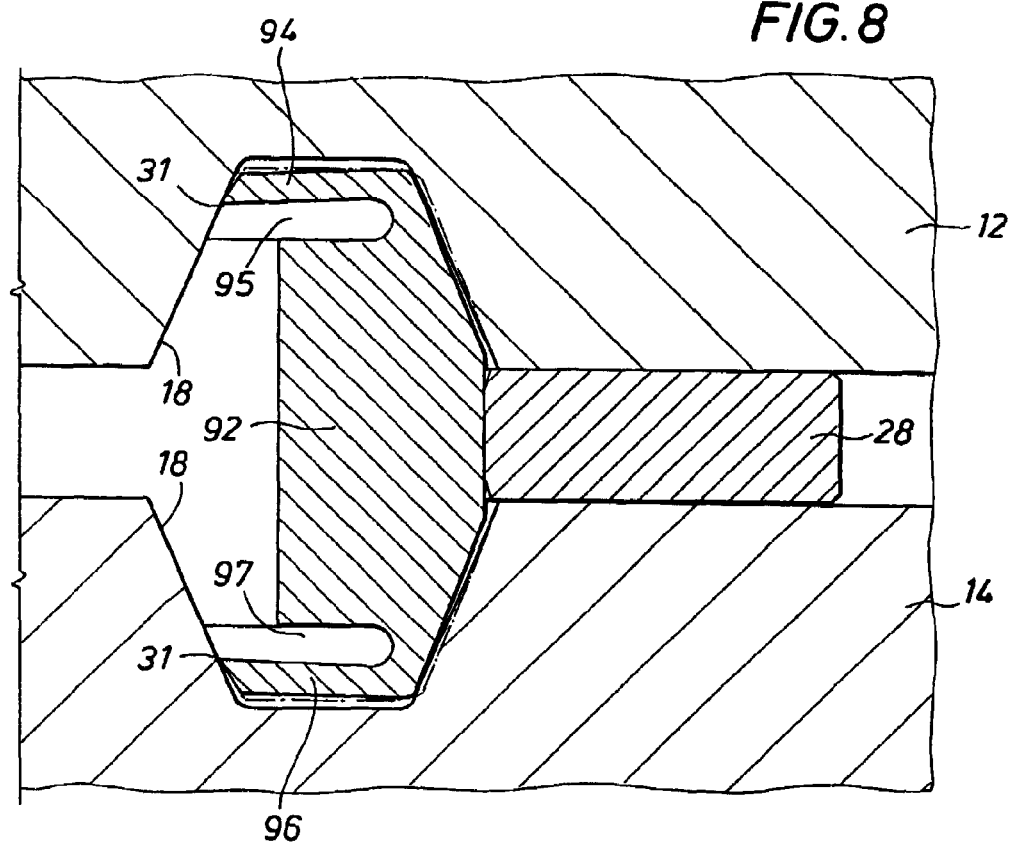
FIG. 8 discloses an embodiment of a seal ring with a radially extending flexible flange.

FIG. 8 depicts yet another seal body 92 having a flange 28 secured thereto, with the seal body 92 supporting a pair of flexible flanges 94 and 96 each configured for substantially line contact sealing engagement at 31 with the radially inner wall 18 of each body 12, 14. A substantially radially extending gap 95 and 97 is provided between and flexible flange and the seal body for fluid pressure energization of each flexible flange.

Figure 9:
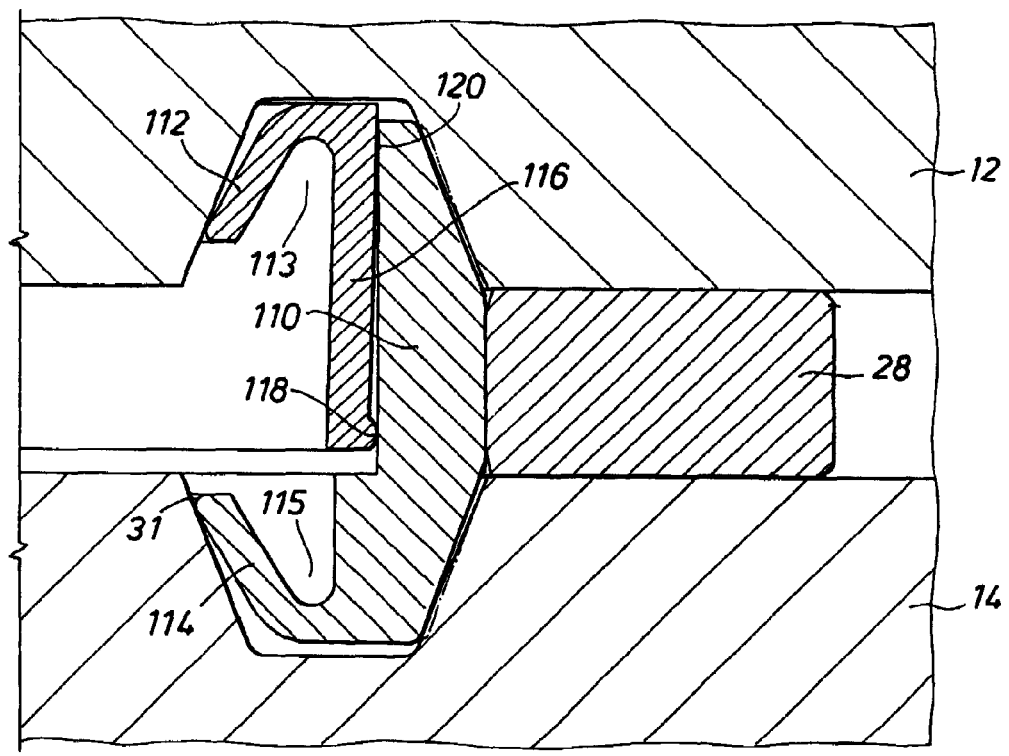
FIG. 9 discloses a flexible flange slidably movable relative to a seal body.

FIG. 9 depicts an alternative seal body 110 having a radially outward flange 28 secured thereto. In this case, flange 114 is provided on the seal body for substantially line contact sealing engagement at 31 with the tapered surface 18 on the lower member 14, with a groove 115 provided between the flexible flange 114 and the body 110. A flange 112 is provided on flange support 116, which is slidable in a substantially radial direction relative to the body 110. A bump 118 on the flange support 116 provides substantially line contact sealing engagement with the body 110, while the mismatch between the outer surface of the support 116 and the inner surface of the body 110 provides for substantially line contact sealing engagement at 120. Spacing 113 provides for fluid energization of the flexible flange 112. The body 110 also seals with the members 12, 14 by line contact sealing of mismatched angular surfaces, as previously discussed. Increased flexibility is provided since flange 112 is axially movable relative to body 110.

Figure 10A:
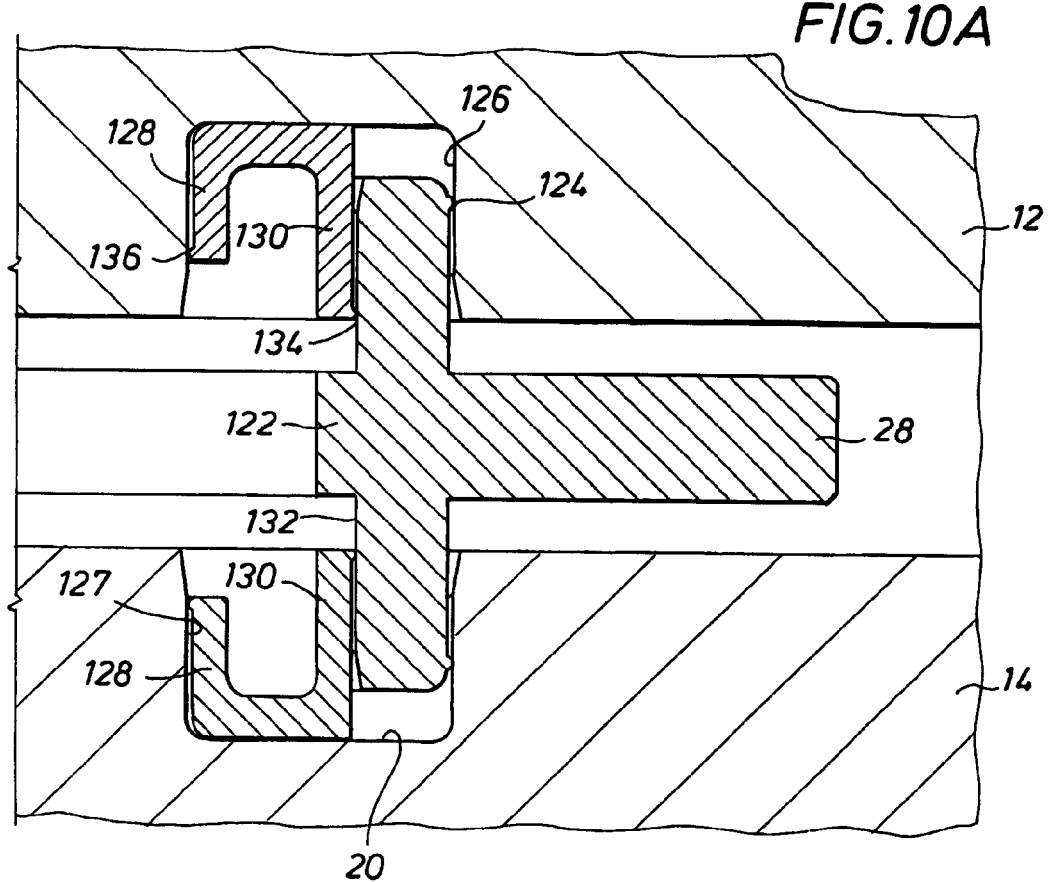
FIGS. 10A and 10B illustrate yet another embodiment of a seal ring wherein a pair of flexible flanges are shown in FIG. 10A supported on a seal ring before the securing members are tightened.
Figure 10B:
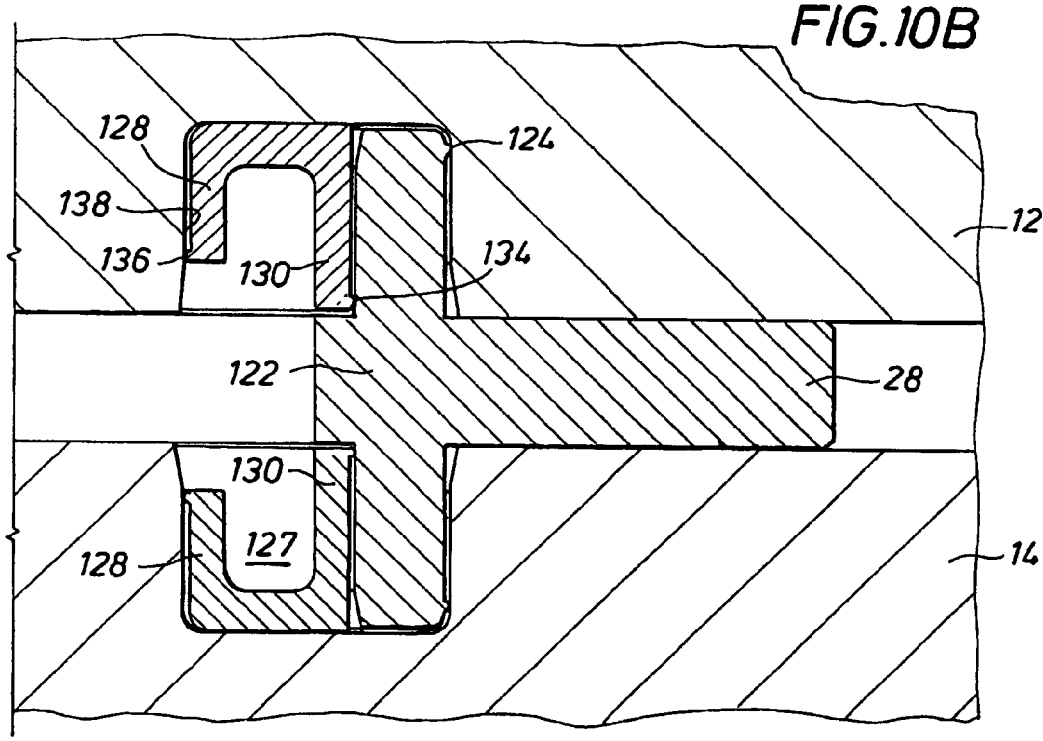

FIG. 10A depicts yet another embodiment of a seal ring including a metal seal body 122 having a flange 28 integral therewith. An annular bump 124 on the seal body is provided for sealing engagement with the radially outward surface 126 of each member 12, 14. A pair of metal flexible flanges 128 each include a support member 130 for slidable engagement with the inner wall 132 of the body 122, and an annular bead or raised section 134 is provided for substantially line contact sealing engagement with the metal seal body. Each flange 128 includes an annular bead 136 for substantially line contact sealing engagement with the inner wall 138 of the groove. Shown in FIG. 10B, the seal ring seals with each member 12, 14 by substantially line contact sealing engagement with radially inward groove surface 138 at point 136 between the metal flexible flange and a respective member, by the seal 134 provided between each flange support member 130 and the metal seal body 122, and by annular bead 124 provided between the metal seal body and the radially outward groove wall 126 of the members 12, 14. The spacing 127 between each flexible flange 128 and a respective support member 130 provides for fluid pressure energization of the flexible flange. Each flexible flange is axially movable relative to the body 122, so that axial variations between the base surfaces 20 of the ring groove do not have a significant adverse effect on sealing effectiveness.

Figure 11A:
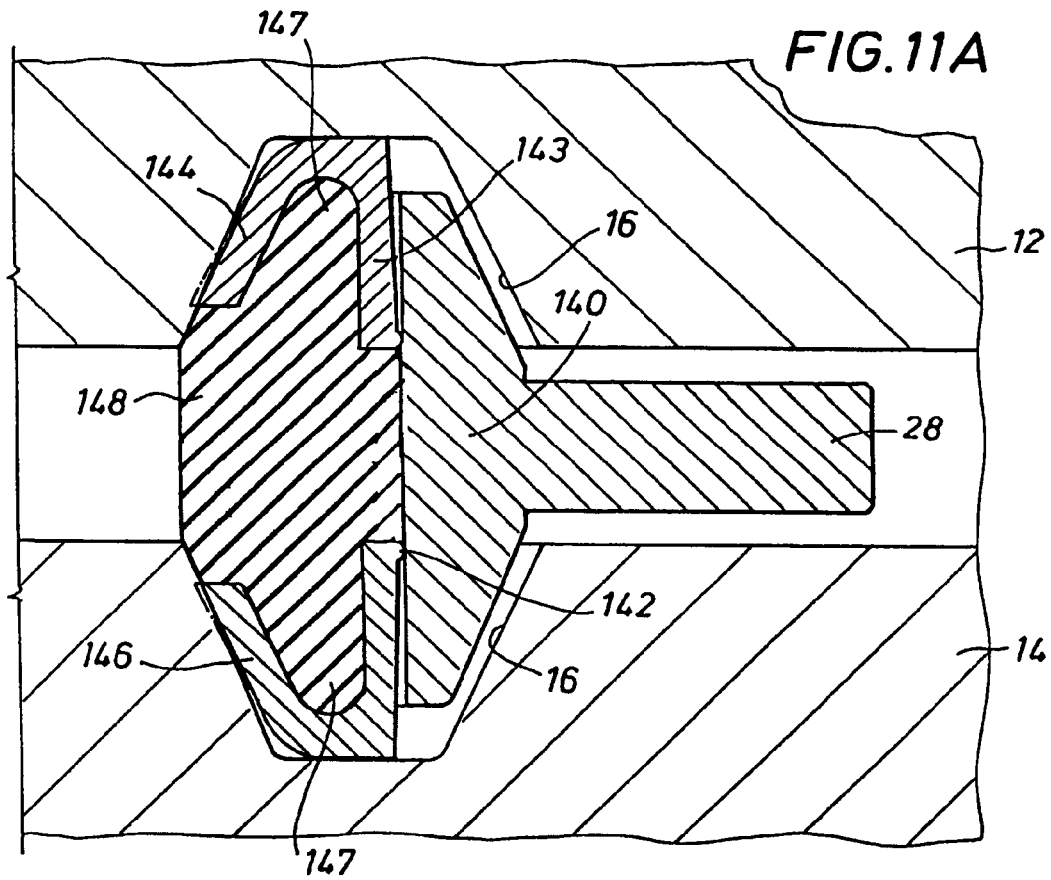
FIG. 11A depicts yet another embodiment of a seal ring prior to the member being secured to the second member.
Figure 11B:
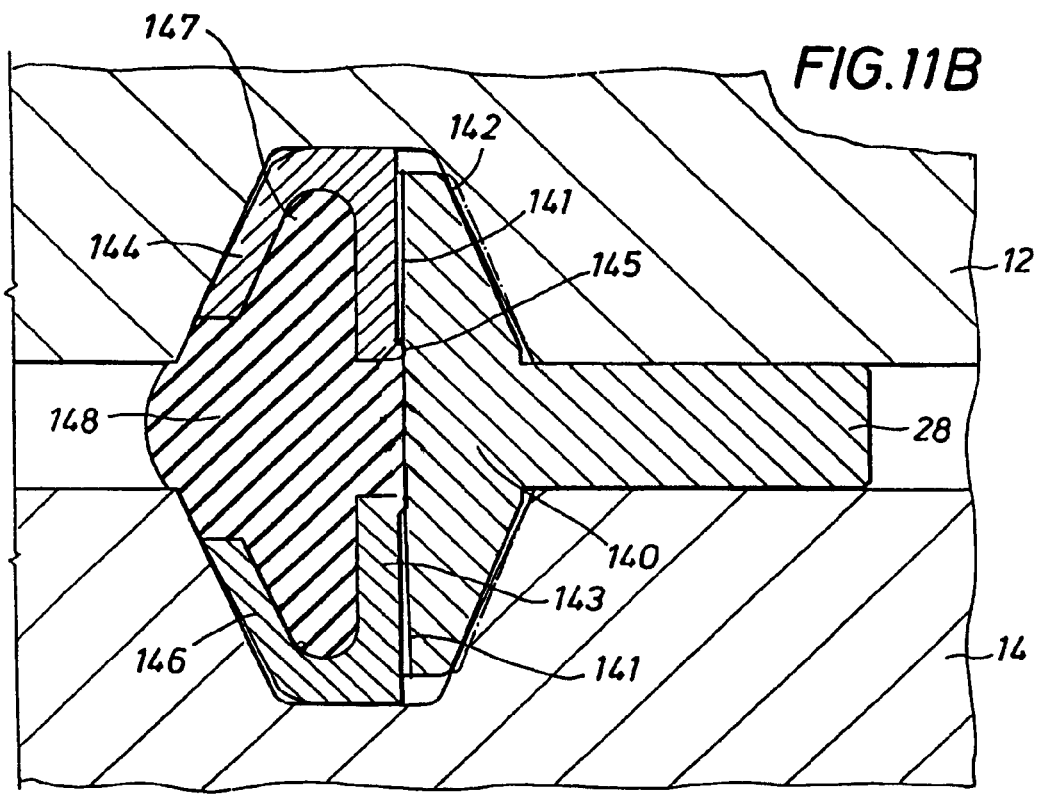
FIG. 11B shows the same seal ring with the first and second members secured.

FIG. 11A discloses another embodiment, wherein the seal body 140 has a flange 28 integral and homogeneous therewith. A mismatch between the outer surfaces on the flange body and the outer tapered groove surfaces 16 on the members 12, 14 provides for substantially line contact sealing engagement between the seal body and the members at point 142, as shown in FIG. 11B. Surfaces 141 on body 140 may be tapered to facilitate sliding the base piece 143 on the seal body 140. Each seal body also includes a pair of flexible flanges 144 and 146 each in contact with an insert body 148. When assembled, line contact sealing engagement at point 31 is formed between each flange 144, 166 and the respective body 12, 14. Protrusion 145 on each base piece 143 forms a line contact seal with surface 141 on seal body 140. The spacing 147 between flexible flanges 144 and 146 and the sliding base piece 143 is preferably filled with a compressible material, as shown in FIG. 11A, such as an elastomer, a high temperature graphite, Teflon™, or a plastic. Base piece 145 may be formed from metal, but alternatively may be a plastic material component. When the bolts are tightened, the insert 148 is compressed, resulting in the seal body shown in FIG. 11B.

According to the present invention, comparatively low preloading may be used to form an effective seal between the groove surfaces of the ANSI or API flange and the seal ring. An API or ANSI flange joint may have mismatched members, and the seal ring groove surface diameters may vary by ±0.032 or more. The seal ring may be pressure energized by the internal pressure within the first and second members to maintain an effective seal.

An API or ANSI seal ring material may have a yield strength of 30,000 pounds or less. The seal ring will thus only stretch 0.001 inches or less per inch of diameter. If the yield strength of the seal ring gasket is increased to 60,000 psi or greater, the seal ring as well as the groove walls may be permanently deformed. The seal ring is sufficiently flexible that the internal pressure will flex the seal ring and make it yield under applications of use, such as flange separation at high temperature. One seal ring may be made to fit one size groove without a problem because of a flexure, yielding, and telescoping capabilities of the seal ring, without the sealing surface being coined and preferably only burnished at the point of sealing contact.

The seal ring is highly interchangeable since the seal ring fits into a standard API and/or ANSI seal ring groove. The features of the seal ring are realized when the flange joint is assembled according to recommended practices.

In a room temperature test on a 2 1/16th inch, 5,000 psi API flange connection with a seal ring according to the present invention, the flange joint was made up finger tight on the bolts, yet the connection held sealing integrity at 100 psi at 70° F. Pressure was subsequently increased to 10,000 psi, and was maintained for 24 hours without leakage.

In a fire test, flanges made from A105 carbon steel, 2 inch size, Class 300 with B7 studs were torqued to 125 pounds. The API classification for this flange is Class F, meaning that the flange should leak under the requirements of the test. During the test, the upper flange reached a temperature of 1225° F., and the lower flange temperature was 1265° F., and the stud temperature reached 1250° F. Sealing integrity was maintained with no leakage, and the flange was subjected to a connection test of 555 psi. As the test equipment cooled down to 72° F., measurements of the stud showed that they averaged 0.010 inch permanent elongation due to high stud torque applied to the studs. The fluid internal pressure does not exert enough separation load on the flange to make the studs yield at this temperature.

It should be understood that the terms "line contact seal" or "substantially line contact sealing" mean that sealing engagement between the metal components is provided by substantially aligned contact engagement, e.g., of a metal flexible flange with one of the first and second members. Such line contact sealing engagement is significantly more effective at sealing than substantial planar-to-planar engagement of metal surfaces. Each flexible flange has a maximum thickness which is substantially less than a radial thickness of the metal body, as shown in FIGS. 2-4 and 6-11. Substantially like contact engagement may nevertheless result from sealing engagement of surfaces over a short length, so that the forces resulting in sealing are concentrated along a small surface area.

Each of the embodiments disclosed herein provides for a relatively thin flexible flange which is responsive to high fluid pressure within the interior of the members 12, 14 to increase sealing effectiveness. Each flexible flange is thus forced into tighter sealing engagement with the respective member when fluid pressure increases. Each flexible flange is also deformed from its original as manufactured condition to a sealing position in which at least part of the seal ring is deformed beyond its elastic limit when securing members secure the first member to the second member.

The seal disclosed herein may be used in API or ANSI flange ring grooves and other special ring grooves, and will maintain seal integrity with very low restraining load, such as stud load, even if the flanges separate a small amount in a fire and the studs elongate in response to a temperature of up to about 1200° F. The seals are especially sensitive to leakage with flange separation. For example, for every 0.001" of flange separation, a prior art seal may lose 0.001" squeeze in each ring groove, and if the seal shifts, the seal may lose 0.002" squeeze and leak. Any movement on standard seals will leak. For the seal as disclosed herein to work in these types of grooves, it forms a dynamic seal that changes its shape as the gland formed by the two ring grooves changes shape, and the seal is pressure energized. The seal design is thus based on flexure, instead of rigidity and high compression loading common for standard seals.

The metal seal body disclosed herein is designed so that it changes shape by flexing, yielding and/or telescoping. Because the seal body can change shape these three ways, shape changes such as thermal expansion and contraction can practically be ignored.

The pressure energized metal seal achieves high sealing with a pressure multiplier designed into the seal. This feature creates a substantially greater force per square inch between the seal ring and the ring groove than the internal pressure on the seal body causing this force. If the internal pressure of 1000 psi acts on 10 square inches and the seal engages the groove at only 0.5 square inches, the force acting on the seal to force sealing engagement is 20,000 pounds.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A method of sealing between first and second members each having a through bore in fluid communication with the throughbore in the other member, each member having a circumferential mating surface extending radially outward from the respective throughbore and a circumferential groove in the mating surface open to the circumferential groove in the other member and having a radially outer circumferential groove surface, a radially inner circumferential groove surface, and a circumferential base surface between a respective outer groove surface and inner groove surface, the outer groove surface being a tapered surface directed radially inward in a direction away from an interface of the first and second members, and the inner groove surface being a tapered surface directed radially outward in a direction away from the interface of the first and second members, and securing members arranged circumferentially about the first and second members to secure the first member to the second member, the method comprising:

engaging a metal seal body with each of the outer groove surface on the first and second members when the securing members secure the first member to the second member;

supporting a pair of flexible flanges on to the seal body and each extending radially inward such that a cantilevered end of a flexible flange provides substantially line contact engagement with one of the base surface and the inward groove surface on a respective first and second member, each of the flexible flanges having a maximum thickness which is substantially less than a maximum thickness of the metal seal body, each of the flexible flanges formed from a metal with a yield strength of 30,000 psi or less; and deforming each flexible flange beyond its elastic limit when the securing members secure the first member to the second member, and a spacing between the flexible flange and the metal seal body projecting radially outward of an inward facing body surface to increase flexibility of the flanges and providing for fluid pressure energization of the flexible flange, the spacing including a minimum spacing between a radially outward planar surface on the flexible flange and a radially inward planar surface of the metal seal body, the minimum spacing being greater than a maximum thickness of the metal flexible flange.

2. A method as defined in claim 1, further comprising:
dimensioning of the metal seal ring and grooves such that when the first and second members are drawn together, the seal body contacts the outer tapered surface of each groove and the line contact surface of each flexible flange contacts the inner tapered wall of a respective groove.

3. A method as defined in claim 1, wherein movement of the members toward each other causes the seal body to slide on the outer surface of each groove creating a burnished seal contact surface, while also forcing the seal body radially inward thereby moving each flexible flange against the inner groove surface and forcing each flexible flange into a reduced diameter surface, causing each flexible flange to yield and confirm to the inner groove surface.

4. A method as defined in claim 1, wherein the seal body and the flexible flange are formed from a unitary homogenous material.

5. A method as defined in claim 1, wherein the seal body and a pair of flexible flanges form a substantially C-shaped cross-sectional configuration.

6. A method of sealing between first and second members each having a through bore in fluid communication with the throughbore in the other member, each member having a circumferential mating surface extending radially outward from the respective throughbore and a circumferential groove in the mating surface open to the circumferential groove in the other member and having a radially outer circumferential groove surface, a radially inner circumferential groove surface, and a circumferential base surface between a respective outer groove surface and inner groove surface, the outer groove surface being a tapered surface directed radially inward in a direction away from an interface of the first and second members, and the inner groove surface being a tapered surface directed radially outward in a direction away from the interface of the first and second members, the method comprising:

engaging a metal seal body with each of the outer groove surface on the first and second members when securing members arranged circumferentially about the first and second members secure the first member to the second member;

providing an annular flange extending radially outward from the seal body for planar engagement with planar flange engaging faces on the first and second members;

supporting a pair of flexible flanges on to the seal body and each extending radially inward and axially toward each other, such that a cantilevered end of a flexible flange provides substantially line contact engagement with one of the base surface and the inward groove surface on a respective first and second member, each of the seal body and the flexible flanges formed from a metal with a yield strength of 30,000 psi or less; and deforming each flexible flange beyond its elastic limit when the securing members secure the first member to the second member, and a spacing between the flexible flange and the metal seal body projecting radially outward of an inward facing body surface to increase flexibility of the flanges and providing for fluid pressure energization of the flexible flange, the spacing including a minimum spacing between a radially outward planar surface on the flexible flange and a radially inward planar surface of the metal seal body, the minimum spacing being greater than a maximum thickness of the metal flexible flange.

7. A method as defined in claim 6, further comprising:
dimensioning of the metal seal ring and grooves such that when the first and second members are drawn together, the seal body contacts the outer tapered surface of each groove and the line contact surface of each flexible flange contacts the inner tapered wall of a respective groove.

8. A method as defined in claim 6, wherein movement of the members toward each other causes the seal body to slide on the outer surface of each groove creating a burnished seal contact surface, while also forcing the seal body radially inward thereby moving each flexible flange against the inner groove surface and forcing each flexible flange into a reduced diameter surface, causing each flexible flange to yield and confirm to the inner groove surface.

9. A method as defined in claim 6, wherein the seal body and the flexible flange are formed from a unitary homogenous material.

10. A method as defined in claim 6, wherein the seal body and a pair of flexible flanges form a substantially C-shaped cross-sectional configuration.

11. A method of sealing between first and second members each having a through bore in fluid communication with the throughbore in the other member, each member having a circumferential mating surface extending radially outward from the respective throughbore and a circumferential groove in the mating surface open to the circumferential groove in the other member and having a radially outer circumferential groove surface, a radially inner circumferential groove surface, and a circumferential base surface between a respective outer groove surface and inner groove surface, the outer groove surface being a tapered surface directed radially inward in a direction away from an interface of the first and second members, and the inner groove surface being a tapered surface directed radially outward in a direction away from the interface of the first and second members, and securing members arranged circumferentially about the first and second members to secure the first member to the second member, the method comprising:

engaging a metal seal body with each of the outer groove surface on the first and second members when the securing members secure the first member to the second member;

supporting a pair of flexible flanges on to the seal body, each of the flexible flanges having a maximum thickness which is substantially less than a maximum thickness of the metal seal body, each of the flexible flanges formed from a metal with a yield of 30,000 psi or less, each flexible flange extending radially inward such that a cantilevered end of a flexible flange provides substantially line contact engagement with one of the base surface and the inward groove surface on a respective first and second member, the seal body and the pair of flexible flanges form a substantially C-shaped cross-sectional configuration; and deforming each flexible flange beyond its elastic limit when the securing members secure the first member to the second member, and a spacing between the flexible flange and the metal seal body projecting radially outward of an inward facing body surface to increase flexibility of the flanges and providing for fluid pressure energization of the flexible flange, the spacing including a minimum spacing between a radially outward planar surface on the flexible flange and a radially inward planar surface of the metal seal body, the minimum spacing being greater than a maximum thickness of the metal flexible flange.

12. A method as defined in claim 11, further comprising: dimensioning of the metal seal ring and grooves such that when the first and second members are drawn together, the seal body contacts the outer tapered surface of each groove and the line contact surface of each flexible flange contacts the inner tapered wall of a respective groove.

13. A method as defined in claim 11, wherein movement of the members toward each other causes the seal body to slide on the outer surface of each groove creating a burnished seal contact surface, while also forcing the seal body radially inward thereby moving each flexible flange against the inner groove surface and forcing each flexible flange into a reduced diameter surface, causing each flexible flange to yield and confirm to the inner groove surface.

\* \* \* \* \*